US010217991B2

(12) United States Patent
Hwang et al.

(10) Patent No.: US 10,217,991 B2
(45) Date of Patent: Feb. 26, 2019

(54) LITHIUM SECONDARY BATTERY

(71) Applicant: SK INNOVATION CO., LTD., Seoul (KR)

(72) Inventors: Duck-Chul Hwang, Gyeonggi-do (KR); Jin-Sub Lim, Daejeon (KR); Kook-Hyun Han, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 272 days.

(21) Appl. No.: 14/728,680

(22) Filed: Jun. 2, 2015

(65) Prior Publication Data

US 2015/0349327 A1 Dec. 3, 2015

(30) Foreign Application Priority Data

Jun. 2, 2014 (KR) .................. 10-2014-0067149
May 7, 2015 (KR) .................. 10-2015-0063764

(51) Int. Cl.
H01M 4/13 (2010.01)
H01M 4/48 (2010.01)
H01M 4/50 (2010.01)
H01M 4/52 (2010.01)
H01M 4/54 (2006.01)
(Continued)

(52) U.S. Cl.
CPC .......... H01M 4/131 (2013.01); H01M 4/133 (2013.01); H01M 4/485 (2013.01); H01M 4/505 (2013.01); H01M 4/525 (2013.01); H01M 4/54 (2013.01); H01M 4/587 (2013.01);
(Continued)

(58) Field of Classification Search
CPC .......... H01M 10/0567; H01M 10/052; H01M 4/485; H01M 4/525; H01M 4/505; H01M 10/0566; H01M 2300/0025
See application file for complete search history.

(56) References Cited

U.S. PATENT DOCUMENTS

2009/0068561 A1* 3/2009 Sun ................. H01M 4/131
429/223
2011/0052980 A1* 3/2011 Sakata .............. H01M 4/131
429/199
(Continued)

FOREIGN PATENT DOCUMENTS

CN 1244046 2/2000
CN 1481041 3/2004
(Continued)

OTHER PUBLICATIONS

Office Action issued by the State Intellectual Property Office dated Mar. 31, 2017.

Primary Examiner — Jonathan Crepeau
Assistant Examiner — Angela J Martin
(74) Attorney, Agent, or Firm — IP & T Group LLP

(57) ABSTRACT

A lithium secondary battery includes a positive electrode, a negative electrode, and a non-aqueous electrolyte, and more particularly, the positive electrode includes a positive active material including lithium-metal oxide in which at least one metal has a continuous concentration gradient from the center to the surface, and the negative electrode includes a negative active material including graphite having an average lattice distance ($d_{002}$) in the range of 3.356 to 3.365 Å, thereby improving storage characteristics at a high temperature and lifetime characteristics.

7 Claims, 2 Drawing Sheets

(51) Int. Cl.
*H01M 4/58*          (2010.01)
*H01M 4/131*         (2010.01)
*H01M 4/525*         (2010.01)
*H01M 4/505*         (2010.01)
*H01M 4/485*         (2010.01)
*H01M 4/133*         (2010.01)
*H01M 4/587*         (2010.01)
H01M 4/02            (2006.01)
H01M 10/0525         (2010.01)

(52) U.S. Cl.
CPC .. *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

| | | | | |
|---|---|---|---|---|
| 2014/0027670 A1* | 1/2014 | Sun | ............ | H01M 4/483 |
| | | | | 252/182.1 |
| 2014/0087266 A1* | 3/2014 | Li | ............ | H01M 4/485 |
| | | | | 429/231.3 |
| 2014/0158932 A1* | 6/2014 | Sun | ............ | H01M 4/13 |
| | | | | 252/182.1 |

FOREIGN PATENT DOCUMENTS

| | | |
|---|---|---|
| CN | 102714311 | 10/2012 |
| CN | 103370818 | 10/2013 |
| KR | 1020060134631 | 12/2006 |

* cited by examiner

LITHIUM SECONDARY BATTERY

CROSS-REFERENCE TO RELATED APPLICATION

This application claims priority to and the benefit of Korean Patent Application No. 2015-0063764, filed on May 7, 2015 and Korean Patent Application No. 2014-0067149, filed on Jun. 2, 2014, the disclosure of which is incorporated herein by reference in its entirety.

BACKGROUND

1. Field of the Invention

The present invention relates to a lithium secondary battery, and more particularly, to a lithium secondary battery having excellent storage characteristics at a high temperature and excellent lifetime characteristics.

2. Description of Related Art

As the electronic, communication, and computer industries are rapidly developed, portable electronic communication devices such as camcorders, cellphones, notebook PCs, and/or the like are dramatically improved. Thus, demand for lithium second batteries as power sources to drive the above devices is increased daily. In particular, related to eco-friendly power sources of applications such as electronic vehicles, uninterruptible power devices, power tools, satellites, and/or the like, research and development are being actively progressed in Japan, Europe, the United States of America, and/or the like as well as in Korea.

Lithium secondary batteries developed in the early 1990s among currently applied secondly batteries are composed of a negative electrode formed of a carbon material, etc., which is capable of adsorbing and ejecting lithium ions, a positive electrode formed of lithium based oxides, etc., and a non-aqueous electrolyte in which lithium salts are dissolved in a composite organic solvent by a proper amount.

However, as application ranges of the lithium secondary batteries are increased, cases for using the lithium secondary batteries under more harsh environmental conditions, such as a high temperature or low temperature condition, are increased.

However, metal components of lithium transition metal oxides or the complex oxides which are used as positive active materials of the lithium secondary batteries are separated from the positive electrode in a fully charged state during high temperature storage, and thus become thermally unstable.

In order to solve the above problem, Korean Patent Publication No. 10-2006-0134631 disclosed core-shell structured positive active materials with high capacity and safety and their preparing method for lithium secondary batteries, but the lifetime characteristics are not increased sufficiently.

SUMMARY OF THE INVENTION

An embodiment of the present invention is directed to providing a lithium secondary battery having excellent storage characteristics at a high temperature and excellent lifetime characteristics.

In accordance with the embodiment of the present invention, a lithium secondary battery includes: a positive electrode; a negative electrode; and a non-aqueous electrolyte, wherein the positive electrode includes a positive active material including a lithium-metal oxide in which at least one metal has a continuous concentration gradient from the center to the surface of the positive active material, and wherein the negative electrode includes a negative active material including graphite having an average lattice distance ($d_{002}$) in the range of 3.356 to 3.365 Å.

The lithium-metal oxide may include at least one of the metals having a constant concentration from the center to the surface of the positive active material.

The lithium-metal oxide may include the first metal having the concentration gradient range in which the concentration increases from the center to the surface of the positive active material, and the second metal having the concentration gradient range in which the concentration decreases from the center to the surface of the positive active material.

The lithium-metal oxide is represented by the following Chemical Formula 1, and at least one of M1, M2, and M3 in the following Chemical Formula 1 has a continuous concentration gradient from the center to the surface of the positive active material.

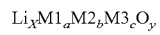  [Chemical Formula 1]

(wherein M1, M2, and M3 are selected from the group consisting of Ni, Co, Mn, Na, Mg, Ca, Ti, V, Cr, Cu, Zn, Ge, Sr, Ag, Ba, Zr, Nb, Mo, Al, Ga, and B, and $0<x\le1.1$, $2\le y\le2.02$, $0\le a\le1$, $0\le b\le1$, $0\le c\le1$, and $0<a+b+c\le1$.)

At least one of the M1, M2, and M3 has the concentration gradient range in which the concentration increases from the center to the surface, and the remainder thereof has the concentration gradient range in which the concentration decreases from the center to the surface.

One of the M1, M2, and M3 has the concentration gradient range in which the concentration increases from the center to the surface of the positive active material, and another one has the concentration gradient range in which the concentration decreases from the center to the surface of the positive active material, and the other one has a constant concentration from the center to the surface of the positive active material.

In the lithium secondary battery, the M1, M2, and M3 are Ni, Co, and Mn, respectively.

In the lithium secondary battery, the M1 is Ni, and $0.6\le a\le0.95$ and $0.05\le b+c\le0.4$.

In the lithium secondary battery of any one of claim 4, the M is Ni, and $0.7\le a\le0.9$ and $0.1\le b+c\le0.3$.

In the lithium secondary battery, the shape of primary particles of the lithium-metal oxide is a rod type.

In the lithium secondary battery, the graphite has an average lattice distance ($d_{002}$) in the range of 3.356 to 3.365 Å.

In the lithium secondary battery, the graphite is a blending of the first graphite having an average lattice distance ($d_{002}$) in the range of 3.356 to 3.360 Å and the second graphite having an average lattice distance ($d_{002}$) in the range of 3.361 to 3.365 Å.

In the lithium secondary battery, the blending weight ratio of the first graphite and the second graphite is in the range of 0:100 to 90:10.

In the lithium secondary battery, wherein the blending weight ratio of the first graphite and the second graphite is in the range of 0:100 to 50:50.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
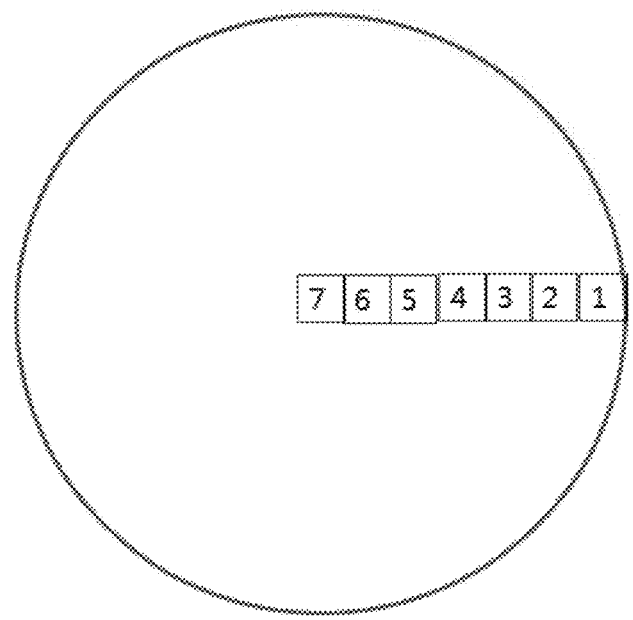
FIG. 1 is a view briefly illustrating concentration detects positions of lithium-metal oxide according to an example of the present invention.

According to the present invention, in a lithium secondary battery comprising a positive electrode, a negative electrode, and a non-aqueous electrolyte, the positive electrode includes a positive active material including a lithium-metal oxide in which at least one metal has a continuous concentration gradient from the center to the surface of the positive active material, and the negative electrode includes a negative active material including graphite an average lattice distance ($d_{002}$) in the range of 3.356 to 3.365 Å, and thus, storage characteristics at a high temperature and lifetime characteristics are improved.

Hereinafter, the present invention will be described in detail.

Positive Active Material

A positive active material of the present invention includes lithium-metal oxide in which at least one metal has the continuous concentration gradient from the center to the surface. The above positive active material has excellent lifetime characteristics compared with a positive active material having a constant concentration.

In the present invention, the metal among the lithium-metal oxide has the continuous concentration gradient from the center to the surface, and thus, metal except the lithium has the concentration distribution which is changed from the center to the surface of the lithium-metal oxide particle at a constant tendency. The constant tendency represents a tendency to decrease or increase the change in an overall concentration, but does not exclude a value opposed to the above tendency at some points.

The center of the particle of the present invention refers to the range within a radius of 0.2 μm from the center of the material particle, and the surface of the particle refers to the range within 0.2 μm from the outermost surface of the particle.

The positive active material of the present invention includes at least one metal having the concentration gradient. Thus, the positive active material may include the first metal having the concentration gradient range increasing from the center to the surface, and the second metal having the concentration gradient range decreasing from the center to the surface. The first metal and the second metal may independently be one or more types.

According to another embodiment of the present invention, the positive active material of the present invention may include at least one of the metals having a constant concentration from the center to the surface of the positive active material.

A specific example of the positive active material of the present invention may include a lithium-metal oxide represented by the following Chemical Formula 1, and in the following Chemical Formula 1, at least one of M1, M2, and M3 has a continuous concentration gradient from the center to the surface.

$$Li_xM1_aM2_bM3_cO_y \qquad \text{[Chemical Formula 1]}$$

(wherein M1, M2, and M3 are selected from the group consisting of Ni, Co, Mn, Na, Mg, Ca, Ti, V, Cr, Cu, Zn, Ge, Sr, Ag, Ba, Zr, Nb, Mo, Al, Ga, and B, and $0<x\le1.1$, $2\le y\le2.02$, $0\le a\le1$, $0\le b\le1$, $0\le c\le1$, and $0<a+b+c\le1$.)

In the embodiment of the present invention, at least of M1, M2, and M3 has the concentration gradient range increasing from the center to the surface, and the remainder thereof may have the concentration gradient range decreasing from the center to the surface.

In another embodiment of the present invention, any one of M1, M2, and M3 has the concentration gradient range increasing from the center to the surface, and another one thereof may have the concentration gradient range decreasing from the center to the surface, and the other one thereof may have a constant concentration from the center to the surface.

In a specific example of the present invention, M1, M2, and M3 may be Ni, Co, and Mn, respectively.

The lithium-metal oxide of the present invention may include a relatively high content of nickel (Ni). When nickel is used, battery capacity may be increased, and, in a conventional positive active material structure, when the nickel content is high, lifetime is decreased, but the positive active material of the present invention does not decrease lifetime although the nickel content is high. Thus, the positive active material of the present invention has excellent lifetime characteristics while maintaining the high capacity.

For example, in the lithium-metal oxide of the present invention, the molar ratio of nickel is in the range of 0.6 to 0.95, and preferably the range of 0.7 to 0.9. That is, when M of the Chemical Formula 1 is Ni, the Chemical Formula 1 may include $0.6\le a\le 0.95$ and $0.05\le b+c\le 0.4$, and preferably, $0.7\le a\le 0.9$ and $0.1\le b+c\le 0.3$.

The lithium-metal oxide of the present invention is not limited to a particular particle shape thereof, but preferably, the primary particles may be a rod type.

The lithium-metal oxide of the present invention is not limited to a particular particle size thereof and for example, may have a particle size in the range of 3 to 20 μm.

The positive active material of the present invention may further include a coating layer on the lithium-metal oxide. The coating layer may include a metal or a metal oxide, and for example, may include Al, Ti, Ba, Zr, Si, B, Mg, P, and an alloy thereof, or include a metal oxide thereof.

The positive active material of the present invention may be the above-described lithium-metal oxide doped with a metal or a metal oxide. A metal or a metal oxide, which allows doping, may include Al, Ti, Ba, Zr, Si, B, Mg, P and an alloy thereof, or a metal oxide thereof.

The lithium-metal oxide of the present invention may be prepared using co-precipitation.

Hereinafter, a method of manufacturing a positive active material according to an embodiment of the present invention will be described.

Firstly, metal precursor solutions having different concentrations are prepared. The metal precursor solutions include a precursor of at least one type to be included in the positive active material. Examples of the metal precursor may include a metal halide, a hydroxide, an acid salt, and/or the like.

The metal precursor solutions to be prepared include two types of precursor solutions which include a precursor solution making the concentration of the center of the positive active material and a precursor solution making the concentration of the surface. For example, when a metal oxide positive active material including nickel, manganese, cobalt as well as lithium is prepared, a precursor solution having the concentration of nickel, manganese, cobalt corresponding to the center of the positive active material and a precursor solution having the concentration of nickel, manganese, cobalt corresponding to the surface are prepared.

Then, the two types of metal precursor solutions are mixed to form a precipitate. During the mixing, the blending ratio of the two types of the metal precursor solutions is continuously changed to correspond to the concentration gradient in a desired active material. Thus, the precipitate has the concentration gradient in the active material. The precipitate is performed by adding chelating agent and a base during the blending.

The prepared precipitate is thermally treated, blended with a lithium salt, and then thermally treated again, and thus, the positive active material of the present invention is obtained.

Negative Active Material

A negative active material of the present invention includes graphite having an average lattice distance ($d_{002}$) in the range of 3.356 to 3.365 Å. When a lithium secondary battery of the present invention uses the graphite having a value in the above-described d002 range as the negative active material and the above-described positive active material, lifetime characteristics may be greatly increased. Thus, the average lattice distance ($d_{002}$) may preferably be in the range of 3.361 to 3.365 Å. When the average lattice distance ($d_{002}$) is less than 3.356 Å, the lifetime characteristics are degraded, and when the average lattice distance ($d_{002}$) is more than 3.365 Å, storage capacity is decreased.

Here, the graphite of the present invention may use a composite of a first graphite having the average lattice distance ($d_{002}$) in the range of 3.356 to 3.360 Å and a second graphite having the average lattice distance ($d_{002}$) in the range of 3.361 to 3.365 Å. When the above blending is used, the lifetime characteristics are preferably increased. Here, the blending weight ratio of the first graphite and the second graphite may be in the range of 0:100 to 90:10. In terms of increasing the lifetime characteristics in the case of blending the first graphite with the second graphite, the blending weight ratio of the first graphite and the second graphite may be more preferable in the range of 0:100 to 50:50. As an amount of the second graphite is greater than that of the first graphite, the lifetime characteristics are further increased.

A size of the graphite used in the present invention is not limited, but an average size may be in the range of 5 to 30 μm.

Secondary Batteries

The present invention provides a lithium secondary battery prepared using the above-described positive active material and a negative active material.

The lithium secondary battery of the present invention may be prepared to comprise a positive electrode, a negative electrode, and a non-aqueous electrolyte.

The positive electrode and the negative electrode may be prepared by blending and stirring the above-described positive active material of the present invention and the negative active material with a binder, a conductive material, a dispersant as required to prepare a composition, and the above blending is coated on a current collector of a metal material and compressed and dried, thereby preparing the positive electrode and the negative electrode.

A well-known binder may be used without limitation, for example, an organic based binder such as a polyvinylidene fluoride-hexafluoropropylene copolymer (PVDF-co-HFP), polyvinylidenefluoride (PVDF), polyacrylonitrile, polymethylmethacrylate, and/or the like, or an aqueous based binder such as styrene-butadiene rubber (SBR), and/or the like may be used with a thickener such as carboxymethyl cellulose (CMD), and/or the like.

A general conductive carbon material may be used as a conductive material without limitation.

A current collector of metal material may use any metal which has high conductivity and may be easily attached to a compound of the positive electrode or the negative active material and does not react in a voltage range of the battery. Non-limiting examples of a positive electrode current collector may include a foil prepared by aluminum, nickel, or a combination thereof, and non-limiting examples of a negative electrode current collector may include a foil prepared by copper, gold, nickel, copper alloy, or a combination thereof.

A separator is interposed between the positive electrode and the negative electrode, and the separator may include a monolayer or a multilayer structure using a general porous high polymer film, for example, a polyolefin based high polymer such as an ethylene homopolymer, a propylene homopolymer, an ethylene/butene copolymer, an ethylene/hexene copolymer, an ethylene/methacrylate copolymer, and/or the like, or a general porous non-woven fabric, for example, a non-woven fabric including a glass fiber with a high melting point, a polyethyleneterephthalate fiber, and/or the like, but is not limited to the above. The separator may be applied to the battery through a general winding method, lamination (stack) of the separator and the battery, a folding method, and/or the like.

The non-aqueous electrolyte includes a lithium salt, which is an electrolyte, and an organic solvent, and the lithium salt may include a general lithium salt used for a lithium secondary battery without limitation, and the organic solvent may include at least one or a mixture of more than two selected from the group consisting of propylene carbonate (PC), ethylene carbonate (EC), diethyl carbonate (DEC), dimethyl carbonate (DMC), ethylmethylcarbonate (EMC), methylpropyl carbonate, dipropyl carbonate, dimethylsulfide oxide, acetonitrile, dimethoxyethane, diethoxyethane, vinylene carbonate, sulfolane, gamma-butyrolactone, propylene sulfite, and tetrahydrofuran.

The non-aqueous electrolyte is injected into an electrode structure formed with a positive electrode, a negative electrode, and the separator interposed between the positive electrode and the negative electrode, and thus, the lithium secondary battery is prepared. A shape of the lithium secondary battery of the present invention is not limited, but may have a cylindrical shape using a can, a prismatic shape, a pouch shape, a coin shape, and/or the like.

Hereinafter, a charge collecting plate for a fuel cell and a stack structure having the same according to examples of the present invention will be described in detail with reference to the enclosed drawings. It is important to understand that the present invention may be embodied in many alternative forms and should not be construed as limited to the examples set forth herein. While the invention is susceptible to various modifications and alternative forms, specific examples thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Example 1

Positive Electrode

A material having $LiNi_{0.8}Co_{0.1}Mn_{0.1}O_2$ as an overall composition, that is, a lithium-metal oxide (hereinafter, CAM-10) having the concentration gradient from the central composition $LiNi_{0.84}Co_{0.11}Mn_{0.05}O_2$ to the surface composition $LiNi_{0.78}Co_{0.10}Mn_{0.12}O_2$ was used as a positive active material, and Denka Black was used as a conductive material, and PVDF was used as a binder, and thus, the positive active material blending having a composition of a blending ratio of 92:5:3 was prepared, and then, the positive active material blending was coated, dried, and pressed on an aluminum base, thereby preparing the positive electrode.

Here, the concentration gradient of the prepared lithium-metal oxide is the same as Table 1 below, and positions at which the concentration was measured are shown in FIG. 1. The measurement positions were spaced apart by 517 μm with respect to lithium-metal oxide particles having a radius of 5 μm from the center to the surface.

TABLE 1

<Negative electrode>

| Position | Ni | Mn | Co |
|---|---|---|---|
| 1 | 77.97 | 11.96 | 10.07 |
| 2 | 80.98 | 9.29 | 9.73 |
| 3 | 82.68 | 7 | 10.32 |
| 4 | 82.6 | 7.4 | 10 |
| 5 | 82.55 | 7.07 | 10.37 |
| 6 | 83.24 | 5.9 | 10.86 |
| 7 | 84.33 | 4.84 | 10.83 |

A negative active material blending including natural graphite (d002: 3.358 Å) at 93 wt % used as a negative active material, a flake type conductive material KS6 at 5 wt % used as a conductive material, SBR at 1 wt % used a binder, and CMC at 1 wt % used as a thickener was coated, dried, and pressed on a copper base, and thus, the negative electrode was prepared.

<Battery>

A positive electrode plate and a negative electrode plate were notched with a proper size and stacked, and a separator (polyethylene, a thickness of 25 μm) was interposed between the positive electrode plate and the negative electrode plate to form a cell, and each of a tap portion of the positive electrode and a tap portion of the negative electrode was welded. The welded positive electrode/separator/negative electrode combined structure was inserted in a pouch, and three sides except an injection side for injecting an electrolyte were sealed. Here, a portion at which a tap was disposed was included in the sealed portion. An electrolyte was injected through the remaining unsealed side, and the remaining side was sealed, and then, the above structure was impregnated for more than 12 hours. The electrolyte was prepared by a 1M $LiPF_6$ solution using a mixed solvent of EC/EMC/DEC (25/45/30; volume ratio), and then, vinylene carbonate (VC) at 1 wt %, 1,3-propensultone (PRS) at 0.5 wt %, and lithium bis (oxalato) borate (LiBOB) at 0.5 wt % were added to be used.

Then, a pre-charging current (2.5 Å) corresponding to 0.25 C was applied for 36 minutes. After 1 hour, the above-structure was degassed, and aged for more than 24 hours, and then formation charging-discharging (charging condition of CC-CV 0.2 C 4.2 V 0.05 C CUT-OFF, discharging condition CC 0.2 C 2.5 V CUT-OFF) was performed. Then, standard charging-discharging (charging condition of CC-CV 0.5 C 4.2 V 0.05 C CUT-OFF, discharging condition CC 0.5 C 2.5 V CUT-OFF) was performed.

Examples 2 to 7

A battery was prepared in the same method as Example 1 except using a blending of natural graphite (d002: 3.358 Å) and artificial graphite (d002: 3.363 Å) as a negative active material. Blending ratios of the natural graphite to the artificial graphite are shown in Table 2.

Comparative Example 1

A battery was prepared in the same method as Example 1 except $LiNi_{0.8}Co_{0.1}Mn_{0.1}O_2$ (hereinafter, CAM-20) having a constant composition in an overall particle was used as a positive active material.

Comparative Examples 2 to 7

A battery was prepared in the same method as Comparative Example 1 except a blending of natural graphite (d002: 3.358 Å) and artificial graphite (d002: 3.363 Å) was used as a negative active material. Blending ratios of the natural graphite to the artificial graphite are shown in Table 2.

Comparative Examples 8 to 11

A battery was prepared in the same method as Comparative Example 1 except a material shown in Table 3 was used as a positive active material and a negative active material.

Experimental Example 1

1. Lifetime Characteristics at Room Temperature

Cells prepared by the examples and comparative examples were repeatedly charged (CC-CV 2.0 C 4.2 V 0.05 C CUT-OFF) and discharged (CC 2.0 C 2.75 V CUT-OFF) 500 times, and then, a discharging capacity at the 500th time was calculated with respect to percent (%) of a one-time discharging capacity to measure the lifetime characteristics at room temperature.

The result is shown in Table 2.

2. Recovery of Capacity

Cells of the examples and comparative examples charged at a condition of CC-CV 0.5 C 4.2 V 0.05 C CUT-OFF were stored in an oven at 60° C. for four weeks, and then discharged at a condition of CC 0.5 C 2.75 V CUT-OFF, and charged at a condition of CC-CV 0.5 C 4.2 V 0.05 C CUT-OFF, and then, discharged again at a condition of CC 0.5 C 2.75 V CUT-OFF, and a discharging amount thereof was compared with a discharging amount of standard discharging to measure the recovery of the capacity.

The result was described in Table 2.

TABLE 2

| | positive active material | negative active material type | blending ratio | lifetime (%) (500 cycle) | recovery of capacity after 4 weeks (%) |
|---|---|---|---|---|---|
| Example 1 | CAM-10 | natural graphite/ artificial graphite | 100/0 | 80 | 78 |

TABLE 2-continued

| | positive active material | negative active material type | blending ratio | lifetime (%) (500 cycle) | recovery of capacity after 4 weeks (%) |
|---|---|---|---|---|---|
| Example 2 | CAM-10 | natural graphite/ artificial graphite | 90/10 | 82 | 81 |
| Example 3 | CAM-10 | natural graphite/ artificial graphite | 70/30 | 86 | 83 |
| Example 4 | CAM-10 | natural graphite/ artificial graphite | 50/50 | 88 | 85 |
| Example 5 | CAM-10 | natural graphite/ artificial graphite | 30/70 | 90 | 87 |
| Example 6 | CAM-10 | natural graphite/ artificial graphite | 10/90 | 92 | 89 |
| Example 7 | CAM-10 | natural graphite/ artificial graphite | 0/100 | 95 | 90 |
| Comparative Example 1 | CAM-20 | natural graphite/ artificial graphite | 100/0 | 70 | 80 |
| Comparative Example 2 | CAM-20 | natural graphite/ artificial graphite | 90/10 | 71 | 81 |
| Comparative Example 3 | CAM-20 | natural graphite/ artificial graphite | 70/30 | 73 | 83 |
| Comparative Example 4 | CAM-20 | natural graphite/ artificial graphite | 50/50 | 75 | 85 |
| Comparative Example 5 | CAM-20 | natural graphite/ artificial graphite | 30/70 | 77 | 87 |
| Comparative Example 6 | CAM-20 | natural graphite/ artificial graphite | 10/90 | 79 | 89 |
| Comparative Example 7 | CAM-20 | natural graphite/ artificial graphite | 0/100 | 80 | 90 |
| Comparative Example 8 | CAM-10 | natural graphite (d002 0.350 Å) | used alone | 76 | 78 |
| Comparative Example 9 | CAM-10 | natural graphite (d002 3.370 Å) | used alone | 97 | 90 |
| Comparative Example 10 | CAM-20 | natural graphite (d002 3.350 Å) | used alone | 65 | 80 |
| Comparative Example 11 | CAM-20 | natural graphite (d002 3.370 Å) | used alone | 83 | 90 |

Referring to Table 2, batteries of the examples had excellent lifetime characteristics and storage characteristics at the high temperature (recovery of capacity after storage at the high temperature) compared with the comparative examples.

In particular, Examples 1 to 7 were compared with Comparative Examples 1 to 7, and when the positive active material of the present invention was used, the storage characteristics at the high temperature were the same as or more excellent than in the Comparative Examples, and the lifetime characteristics was more excellent than a positive active material without the concentration gradient.

Also, as a content of the artificial graphite having the interval of d002 of 3.363 Å increased, the increased amount of the lifetime characteristics was increased, and in particular, when the percent of the artificial graphite was greater than that of the natural graphite, a difference in the increased amount becomes evident.

Meanwhile, when the interval d002 was out of the range described above in the present invention in Comparative Examples 9 and 11, the lifetime characteristics and the storage characteristics at the high temperature were the same level as the examples, but the amount of the negative active material was less than or equal to 300 mAh/g, and thus, a capacity of the battery was decreased to an unsuitable level.

Figure 2:
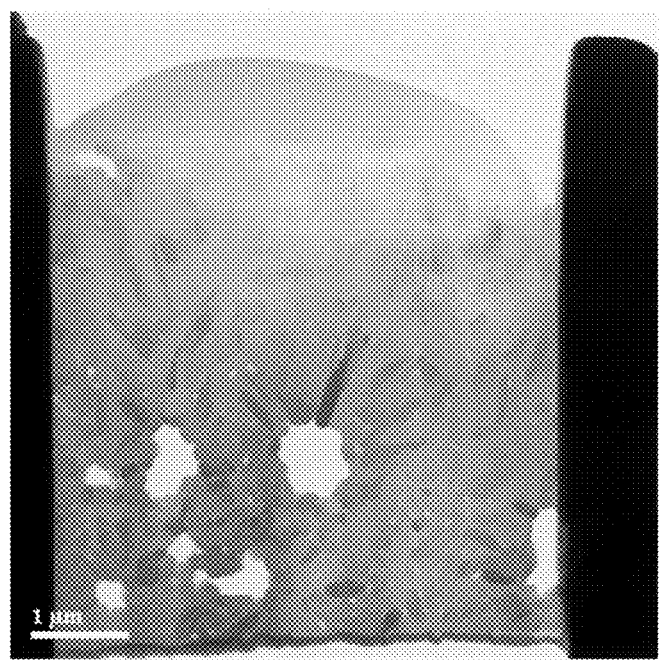
FIG. 2 is a TEM image of a lithium-metal oxide according to Example 1 of the present invention.
Figure 3:
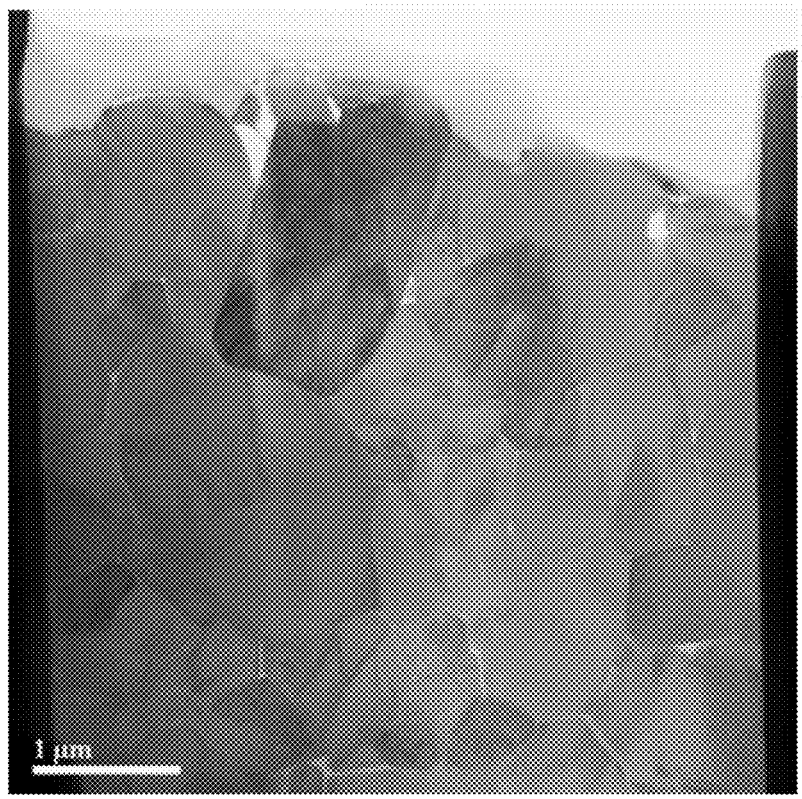
FIG. 3 is a TEM image of a lithium-metal oxide according to Comparative Example 1 of the present invention.

Also, TEM images of the positive active material particles of Example 1 and Comparative Example 1 are shown in FIGS. 2 and 3, respectively Referring to FIG. 2 (Example 1) and FIG. 3 (Comparative Example 1), a first particle of the positive active material of Example 1 had a rod shape, but a first particle of the positive active material of Comparative Example 1 had a substantially spherical shape.

According to the present invention, the lithium secondary batteries of the present invention is constituted of a positive active material including a metal having a continuous concentration gradient and a negative active material including graphite having a specific structure, and thus, storage characteristics at a high temperature and lifetime characteristics are greatly improved.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A lithium secondary battery comprising:
a positive electrode;
a negative electrode; and
a non-aqueous electrolyte,
wherein the positive electrode includes a positive active material including a lithium-metal oxide represented by the following chemical formula 1,

$$Li_xM1_aM2_bM3_cO_y \qquad \text{chemical formula 1}$$

wherein M1, M2, and M3 are selected from the group consisting of Ni, Co, Mn, Na, Mg, Ca, Ti, V, Cr, Cu, Zn, Ge, Sr, Ag, Ba, Zr, Nb, Mo, Al, Ga, and B,
wherein $0<x\le1.1$, $2\le y\le2.02$, $0<a<1$, $0<b<1$, $0<c<1$, and $0<a+b+c\le1$,
wherein M3 has a concentration gradient range in which a concentration increases continuously from a center of the positive active material to a surface of the positive active material,
wherein M1 has a concentration gradient range in which a concentration decreases continuously from the center of the positive active material to the surface of the positive active material,
wherein M2 has a constant concentration from the center of the positive active material to the surface of the positive active material, and
wherein the negative electrode includes a negative active material including graphite which is a blending of a first graphite including a natural graphite and having an average lattice distance ($d_{002}$) in a range of 3.356 to 3.360 Å, and a second graphite including an artificial graphite and having an average lattice distance ($d_{002}$) in a range of 3.361 to 3.365 Å.

2. The lithium secondary battery of claim 1, wherein the M1, M2, and M3 are Ni, Co, and Mn, respectively.

3. The lithium secondary battery of any one of claim 2, wherein the M1 is Ni, and $0.6\le a\le0.95$ and $0.05\le b+c\le0.4$.

4. The lithium secondary battery of any one of claim 2, wherein the M1 is Ni, and $0.7\le a\le0.9$ and $0.1\le b+c\le0.3$.

5. The lithium secondary battery of claim 1, wherein a shape of primary particles of the lithium-metal oxide is a rod type.

6. The lithium secondary battery of claim 1, wherein a blending weight ratio of the first graphite and the second graphite is in a range of 0:100 to 90:10.

7. The lithium secondary battery of claim 1, wherein a blending weight ratio of the first graphite and the second graphite is in a range of 0:100 to 50:50.

* * * * *